Nov. 20, 1928.
W. W. WELLS
1,692,193
FOUR-SPEED TRANSMISSION
Filed Feb. 24, 1925  2 Sheets-Sheet 1
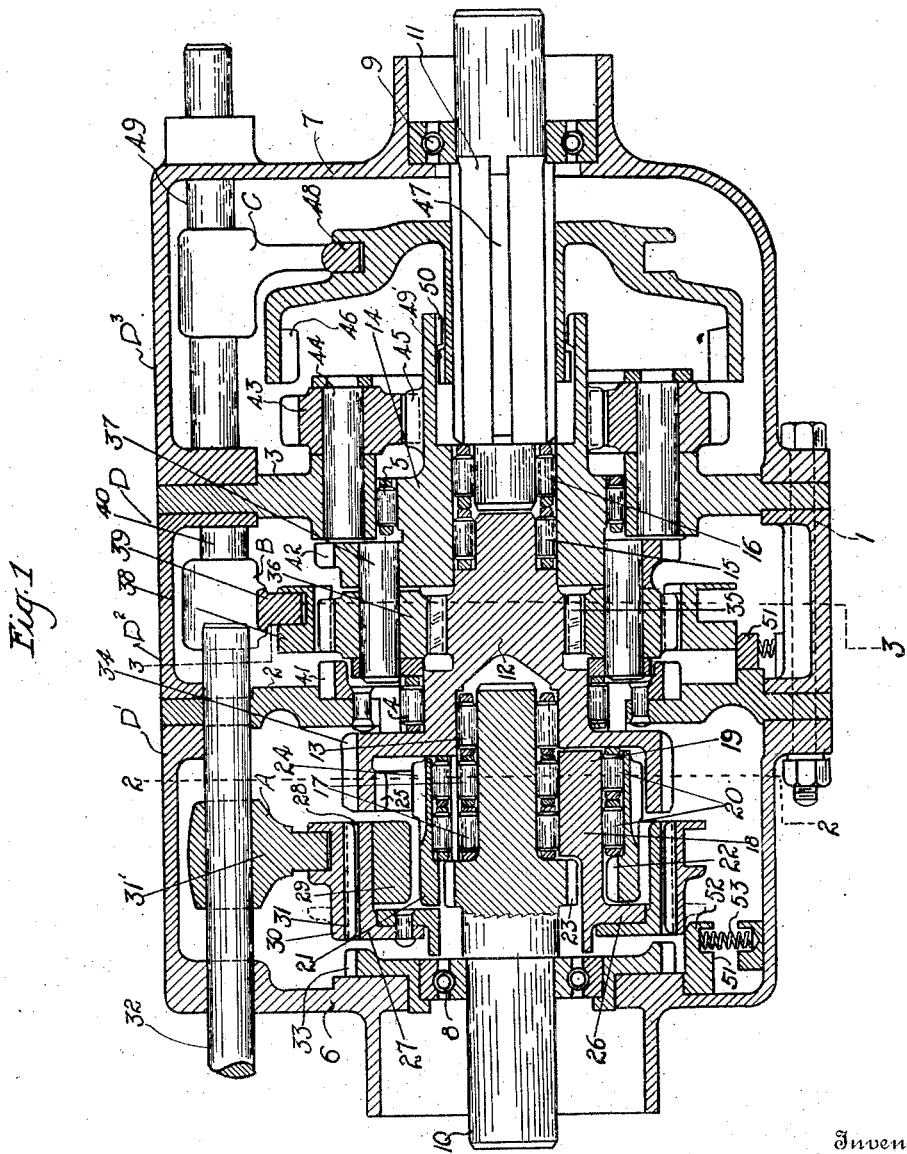
Inventor
Walter W. Wells
By Whittemore Hulbert Whittemore
 Belknap
Attorneys

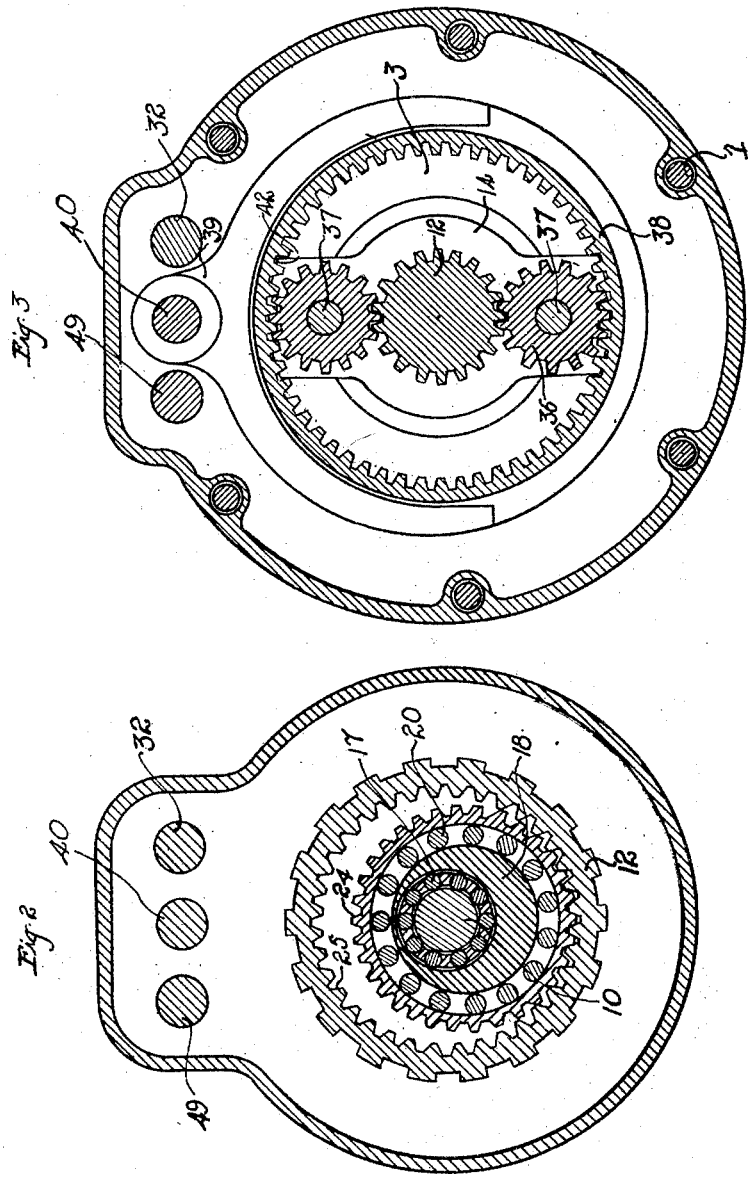

Patented Nov. 20, 1928.

1,692,193

UNITED STATES PATENT OFFICE.

WALTER W. WELLS, OF LANSING, MICHIGAN, ASSIGNOR TO REO MOTOR CAR COMPANY, OF LANSING, MICHIGAN, A CORPORATION OF MICHIGAN.

FOUR-SPEED TRANSMISSION.

Application filed February 24, 1925. Serial No. 11,271.

The invention relates to transmission mechanisms for motor vehicles and the principal object is to produce a quiet running transmission having a plurality of forward and reversing speeds giving a series of speed ratios which are particularly desirable for a motor vehicle operating in both flat and hilly country.

Other objects of the invention reside in the novel construction and combination of parts as hereinafter fully described and illustrated in the accompanying drawings wherein:—

Figure 1 is a longitudinal section through the transmission;

Figure 2 is a transverse section on the line 2—2 of Figure 1;

Figure 3 is another transverse section on the line 3—3 of Figure 1.

The transmission comprises three principal units designated as A, B and C, each of these units containing a gear reduction mechanism operated by a suitable control rod and providing two alternative speeds. The unit A comprises essentially a driving pinion, a concentric internal gear, a revolving carrier member having journaled eccentrically thereon an intermediate gear meshing both with said pinion and said concentric internal gear. The carrier member is adapted to be clutched either to the internal gear or to a fixed member in the transmission case, thereby alternatively compelling the rotation of the parts as a unit forming a direct drive or at a reduction depending upon the relative size of the gears. The unit B is an internal planetary gear reduction provided with means for alternatively forming a direct drive or for obtaining a reduction by causing the planet gears to travel around the sun gear. The unit C is an internal planetary reversing gear adapted to couple the unit B to the driven shaft to drive the latter either directly from the unit B or in the reverse direction at a reduced speed. All of the above mentioned units are mounted in a common transmission casing forming a compact assembly and a unitary structure.

Referring now to the more specific construction illustrated in the drawings, D represents the transmission casing composed preferably of the units $D^1$, $D^2$ and $D^3$ to aid in the assembly of the parts, these units being secured together by suitable means such as the bolts 1 extending through flanges on the respective units. Clamped between the respective units and extending inwardly into the transmission casing are the supporting walls 2 and 3, these walls being provided with central apertures forming bearing faces for the roller bearings 4 and 5. The front and rear walls 6 and 7 respectively are also adapted to receive anti-friction bearings, these being illustrated as the ball bearings 8 and 9, forming the main support for the rotatable units within the transmission.

10 is the driving shaft and 11 the driven shaft journaled respectively in the bearings 8 and 9 and projecting inwardly within the transmission casing in axial alignment. 12 is an intermediate rotatable member journaled at one end by the roller bearing 4 and at the other end by the roller bearing 15, the latter being carried by a rotatable sleeve 14 which in turn is journaled in the roller bearing 5.

The inner end of the driven shaft 11 is journaled in the sleeve 14 by the roller bearing 16 while the inner end of the driving shaft 10 is correspondingly journaled in the rotatable member 12 by the roller bearing 13. The structure as above described provides for a relative motion between each of the various units but allows the same to be rigidly supported in the transmission case to prevent vibration of the same.

Referring now more specifically to the construction of the unit A, the driving shaft 10 has rotatably mounted thereon by the roller bearings 17 the carrier member or eccentric 18, the latter having at its inner end the eccentric hub portion 19 supporting the roller bearings 20 for rotatably mounting the eccentric intermediate gear 21. This gear has at the forward end the internal teeth 22 which continuously mesh with the external pinion teeth 23 on the driving shaft 10 and at the rearward end thereof is formed with the external teeth 24 which continuously mesh with internal teeth 25 carried by the rotatable member 12. The carrier member 18 is provided with a flange 26 to which is secured a ring member 27 having external teeth 28, this ring member also supporting a counterweight 29 for balancing the carrier during its rotation. 30 is a collar having the internal teeth 31 engaging the external teeth 28, this collar being longitudinally slidable on the ring 27 by means of a shifting fork 31', the latter being mounted on the shifting rod 32. 33 are clutch teeth fixed to the wall 6 of the transmission casing and adapted to mesh with the internal teeth 31 of the collar 30 when the latter is shifted to its forward position thereby locking the carrier or eccentric 18 from rotation. The rotatable member 12 also carries at its forward end the external teeth 34 arranged in alignment with the teeth on the collar 30 so that in the rearward position of the latter the carrier 18 will be directly coupled to the rotatable member 12.

From the above description it will be apparent that when the collar 30 is shifted to the rearward position the driving shaft 10 and the intermediate member 12 will be compelled to rotate together, forming a direct drive, the carrier 18, eccentric gear 21 and collar 30 all revolving together as a unit. On the other hand, when the collar 30 is shifted to its forward position it will be fixed against rotation by engaging the fixed clutch teeth 33 thereby locking the carrier 18 to the transmission casing and disengaging the same from the member 12. The drive will now be at a reduced speed through the intermediate gear 21 which meshes both with the pinion 23 and the internal gear teeth 25.

The transmission unit B comprises the sun gear 35 preferably formed integral with the rotatable member 12, this sun gear engaging the planetary gears 36. The latter are rotatably mounted on the stub shafts 37 which project from the sleeve 14. 38 is an internal gear also meshing with the planet gears 36 but arranged to be axially slidable by means of the shifting fork 39 on the shifting rod 40. In the forward position of the internal gear 38 it meshes with the fixed teeth 41 on the wall 2 of the transmission casing thereby preventing the rotation of the same. The rotation of the member 12 therefore compels the rotation of the stub shafts 37 at a reduced speed and the sleeve 14 is consequently driven at a reduction with respect to the member 12. When the internal gear 38 is shifted to its rearward position it is clutched directly to the external teeth 42 on the sleeve 14 and disengaged from the teeth 41 which results in the planet gears 36 being locked to the sleeve 14, the drive then being direct between the sleeve and the rotatable member 12.

The unit C comprises the planetary gears 43 journaled on the stub shafts 44, which in turn, are mounted in the wall 3 of the transmission casing. 45 is a sun gear preferably formed integral with the sleeve 14 and meshing with the planetary gears 43. For producing a reverse drive there is an internal ring gear 46 slidably mounted on the driven shaft 11 and non-rotatably secured thereto by the splines 47. This gear is longitudinally slidable by means of a shifting fork 48 projecting inwardly from the shifting rod 49. In the forward position of the shifting fork the planetary gears engage the internal teeth 46 and since the stub shafts 44 are at all times held stationary the driven shaft 11 is rotated in the reverse direction from the sleeve 14 at a reduced speed. On the other hand when the shifting fork 48 is in its rear position the teeth 46 are disengaged from the planetary gears 43, but in this position the clutch teeth 49' are engaged with corresponding clutch teeth 50 on the sleeve 14 and in this way a direct drive is obtained between the sleeve 14 and driven shaft 11.

In the transmission as above described having three separate units, each provided with two alternative positions of adjustment it will be apparent that there are eight possible speed combinations, four forward drives and four reverse drives. In order to obtain the direct forward drive with the transmission mechanism the shifting forks of the various units are all arranged in the rear position. Assuming that the unit A has a reduction ratio of 1.46 to 1, the unit B a reduction of 3.53 to 1 and the reverse unit C a reduction of 2.25 to 1, (these being the proportions shown in the drawing,) the following speeds may be obtained. With fork 31 in forward position and forks 39 and 48 in rear position, there is a forward drive at a ratio of 1.46 to 1. Shifting the fork 31 to its rear position and the fork 39 to its forward position gives a reduction of 3.53 to 1. When both forks 31 and 39 are in the forward position the ratio is 5.15 to 1, this arrangement utilizing the reduction of both units A and B. The reverse speed is obtained by moving fork 48 to its forward position and if units A and B are at the same time arranged for direct drive the reverse ratio is 2.25 to 1. Three other reverse ratios are obtainable by arranging the shifting forks 31 and 39 in different combinations while retaining the fork 48 in its forward position.

In order to provide a braking action for stopping the rotation of the carriers 18 and 38 before engaging the same with the fixed clutch teeth 33 and 41 respectively, suitable brake shoes are provided, these being represented by the numeral 51. These brake shoes are provided with cam surface 52 and are yieldingly held outward by the springs 53. The brake shoes are arranged in the path of the rotating members so that the latter will engage the same before they are meshed with the fixed clutch teeth.

What I claim as my invention is:—

1. A transmission comprising a casing having a pair of end bearings and a pair of intermediate bearings, all of said bearings being co-axial, a driving shaft journaled in one end bearing, a driven shaft journaled in the other end bearing, an intermediate revoluble member journaled in one intermediate bearing, a sleeve surrounding said intermediate revoluble member and said driven member and journaled in the other intermediate bearing, antifriction bearings between said driving shaft and intermediate member, antifriction bearings between said driven shaft and said sleeve, antifriction bearings between said sleeve and said intermediate member, gearing between said driving shaft and said intermediate member, gearing between said intermediate member and said sleeve and gearing between said sleeve and said driven shaft.

2. A transmission comprising a casing having a pair of end bearings and a pair of intermediate bearings co-axial therewith, a driving shaft in one end bearing, a driven shaft in the other end bearing, a pair of telescopically arranged intermediate members journaled in said intermediate bearings and having an antifriction bearing between each other, one of said intermediate members projecting over said driving shaft and the other intermediate member projecting over said driven shaft, planetary gearing connected to said intermediate members, gearing connecting said driving shaft and one intermediate member and gearing connecting the driven shaft and the other intermediate member.

3. A transmission comprising a casing having a pair of end bearings and a pair of intermediate bearings co-axial therewith, a driving shaft in one end bearing, a driven shaft in the other end bearing, a pair of telescopically arranged intermediate members journaled in said intermediate bearings and having an antifriction bearing between each other, one of said intermediate members projecting over said driving shaft and the other intermediate member projecting over said driven shaft, a pinion on said driving shaft, an eccentrically journaled gear meshing with said pinion, an internal gear on one of said intermediate members also meshing with said eccentrically journaled gear, means for driving said internal gear from said driving shaft alternatively at a reduced ratio through said eccentrically journaled gear or at the same ratio through direct coupling and a planetary reversing gear between said driven shaft and the other intermediate member.

4. A transmission comprising a casing, an annular sleeve journaled therein, an intermediate shaft, a bearing between one end of said intermediate shaft and said casing, a bearing between the other end of said shaft and said sleeve, a sun gear on said shaft intermediate said bearings, planet gears carried by said sleeve and meshing with said sun gear, a longitudinally shiftable annular internal gear meshing with said planet gears, a fixed gear with which said annular gear can mesh, a similar gear on said sleeve, a driving shaft in axial alignment with said intermediate shaft and drivingly connected therewith, a driven shaft in axial alignment with said intermediate shaft and drivingly connected to said sleeve.

5. A transmission comprising a casing, coaxial driving and driven shafts journaled in said casing, an intermediate shaft between said driving and driven shafts and co-axial therewith, said intermediate shaft having a hollow extension surrounding said driving shaft, a sleeve surrounding one end of said intermediate shaft and one end of said driven shaft, a pinion on said intermediate shaft, planet gears carried by said sleeve and meshing with said pinion, planet gears carried by said casing surrounding said sleeve, a sun gear on said sleeve meshing with the last mentioned planet gears, means for alternatively coupling said sleeve to said driven shaft through said planet gears or independent of said planet gears and eccentric gearing between said driving shaft and said intermediate shaft.

In testimony whereof I affix my signature.

WALTER W. WELLS.